United States Patent
Abe et al.

(10) Patent No.: US 11,077,501 B2
(45) Date of Patent: Aug. 3, 2021

(54) METHOD OF MACHINING A ROTATIONALLY SYMMETRIC SURFACE OF A WORKPIECE AND TURNING APPARATUS

(71) Applicant: SUMITOMO ELECTRIC HARDMETAL CORP., Itami (JP)

(72) Inventors: Makoto Abe, Willich (DE); Christoph Zeiner, Willich (DE)

(73) Assignee: Sumitomo Electric Hardmetal Corp., Itami (JP)

( * ) Notice: Subject to any disclaimer, the term of this patent is extended or adjusted under 35 U.S.C. 154(b) by 0 days.

(21) Appl. No.: 16/316,427

(22) PCT Filed: Sep. 9, 2016

(86) PCT No.: PCT/JP2016/004115
§ 371 (c)(1),
(2) Date: Jan. 9, 2019

(87) PCT Pub. No.: WO2018/047212
PCT Pub. Date: Mar. 15, 2018

(65) Prior Publication Data
US 2019/0232382 A1    Aug. 1, 2019

(51) Int. Cl.
*B23B 1/00* (2006.01)
*B23B 27/00* (2006.01)
(Continued)

(52) U.S. Cl.
CPC .............. *B23B 1/00* (2013.01); *B23B 27/005* (2013.01); *B23B 27/141* (2013.01);
(Continued)

(58) Field of Classification Search
CPC ... B23B 27/141; B23B 27/005; B23B 27/148; B23B 1/00; B23B 2200/28; B23B 2250/12; B23Q 7/00
See application file for complete search history.

(56) References Cited

U.S. PATENT DOCUMENTS

| 2,127,523 | A | * | 8/1938 | Kraus | B23B 27/12 82/1.11 |
| 2014/0186127 | A1 | * | 7/2014 | Parker | B23B 29/12 407/7 |
| 2017/0136548 | A1 | * | 5/2017 | Ochiai | B23Q 15/02 |

FOREIGN PATENT DOCUMENTS

| FR | 1123422 A | 9/1956 |
| RU | 2296035 C2 | 3/2007 |
| SU | 1266664 A1 | 10/1986 |

* cited by examiner

*Primary Examiner* — Eric A. Gates
*Assistant Examiner* — Paul M Janeski
(74) *Attorney, Agent, or Firm* — Baker Botts L.L.P.; Michael A. Sartori

(57) ABSTRACT

In accordance with various illustrative embodiments of the present disclosure, a rotationally symmetric surface of a workpiece is machined by a turning apparatus, wherein the workpiece is rotationally driven around a rotational axis, a cutting tool with a cutting edge positioned at the edge of a rake face is arranged relative to the workpiece, the cutting tool is brought into contact with the workpiece, and the cutting tool is advanced relative to the workpiece along a feed direction parallel to the rotational axis, the normal to the rake face being tilted relative to the feed direction, a first axis and a second axis, the first axis and the second axis are perpendicular to the feed direction and perpendicular to each other.

9 Claims, 5 Drawing Sheets

(51) Int. Cl.
 *B23B 27/14* (2006.01)
 *B23Q 7/00* (2006.01)
(52) U.S. Cl.
 CPC .............. *B23B 27/148* (2013.01); *B23Q 7/00* (2013.01); *B23B 2200/28* (2013.01); *B23B 2250/12* (2013.01)

METHOD OF MACHINING A ROTATIONALLY SYMMETRIC SURFACE OF A WORKPIECE AND TURNING APPARATUS

TECHNICAL FIELD

The present disclosure generally relates to a method of machining a rotationally symmetric surface of a workpiece and to turning apparatuses.

BACKGROUND ART

The machining of rotationally symmetric surfaces of a workpiece is normally accomplished by turning devices, such as lathes. In metal cutting operations, turning is one of the most common operations employed for machining a rotationally symmetric surface of a workpiece.

In turning operations, a workpiece is generally driven to rotate about a rotational axis and at least one cutting tool is brought into contact so as to chip away surface material of the workpiece for creating a desired rotationally symmetric surface configuration. This machining may be applied to external or internal surfaces of workpieces to produce an axially symmetrical contoured surface portion.

In general, turning devices have two basic components, such as means for holding a workpiece while it rotates and means for holding and moving cutting tools relative to the workpiece. For example, the workpiece may be held on one or both of its end sides. Holding the workpiece at one end involves gripping the workpiece by chucks or collets. For example, chucks may be mounted on a spindle nose of a turning device, while collets may be usually seated in the spindle of a turning device. The spindle of a turning device is usually mounted in the "headstock" of a turning device, the headstock containing the motor and gear train causing the rotational motion of the workpiece, i.e., driving the workpiece in a rotational movement around a rotational axis. At an opposite end of the turning apparatus relative to the rotational axis, a "tailstock" may be provided, which may be used for holding the workpiece at an end opposite to the end that is supported by the spindle.

SUMMARY OF INVENTION

Technical Problem

There are requirements on the performance of turning apparatuses set by the surface roughness of the machined workpiece, for example. An upper limit of the surface roughness may result from requirements set by the intended use of the machined workpieces, e.g., a fitting gasket should be subjected to as little wear as possible implying a high quality of surface roughness. A lower limit on the surface roughness may result from the requirement that oil and lubricants should adhere to the surface to ensure lubrication of the gasket and to prevent the gasket from overheating.

In the production of rotationally symmetric surfaces of workpieces, there is a need for providing a turning apparatus with a desired cutting force and quality of surface roughness, while improving cutting times during machining workpieces.

Solution to Problem

The following represents a simplified summary of the disclosure in order to provide the basic understanding of some aspects of the invention. This summary is not an exhaustive overview of the invention. It is pointed out that no identification of key or critical elements of the invention or any delineation of the scope of the invention is intended, other than what is defined in the appended claims. The sole purpose of the summary of the disclosure is to present some concepts in a simplified form as a prelude to the more detailed description which is discussed later.

In a first aspect of the present disclosure, a method of machining a rotationally symmetric surface of a workpiece is provided. In accordance with some illustrative embodiments herein, the method comprises rotationally driving the workpiece around a rotational axis, arranging a cutting tool with a cutting edge positioned at an edge of a rake face relative to the workpiece, bringing the cutting tool into contact with the workpiece, and advancing the cutting tool relative to the workpiece along a feed direction parallel to the rotational axis. Herein, a normal to the rake face is tilted relative to the feed direction, a first axis and a second axis, the first axis and the second axis being perpendicular to the feed direction and perpendicular to each other. Upon arranging the cutting tool relative to the workpiece with a predefined tilting of the cutting edge relative to the feed direction, a good surface roughness of machined surfaces may be provided, even at relatively high feed rates.

In accordance with some illustrative embodiments of the first aspect, a direction of the normal of the rake face may be set to a direction rotated around the first axis by an angle α from a start direction identical to a direction of the second axis, such that the normal from the rake face is directed to the feed direction In accordance with some special illustrative examples herein, the angle α may be in a range from about 35° to about 60°. This range of the angle α provides an advantageous orientation of the cutting edge relative to the feed direction for providing good results regarding the surface roughness of the machined surface.

In accordance with some illustrative embodiments of the first aspect, the direction of the normal may be set to a direction (i) rotated around the first axis by the angle α from the start direction identical to the direction of the second axis such that the normal from the rake face is directed to the feed direction and (ii) rotated around a third axis by an angle δ such that the normal from the rake face is directed to the feed direction, and the third axis corresponds to an axis which may originally correspond to the rotational axis RA and may be rotated around the first axis A1 by the angle α. In accordance with some special illustrative examples herein, the angle δ may be in a range from about 0° to about 15°. This range of the angle δ provides an advantageous orientation of the cutting edge relative to the feed direction for providing good results regarding the surface roughness of the machined surface.

In accordance with some illustrative embodiments of the first aspect, a projection of the cutting edge to a plane defined by the rotational axis and one of the first and second axes may be tilted relative to the feed direction at an angle in a range from about 35° to about 60°. This range of tilting angles provides an advantageous orientation of the cutting edge relative to the feed direction for providing good results regarding the surface roughness of the machined surface. In accordance with some special illustrative examples herein, the angle may be in a range from about 40° to about 50°. The normal to the rake face may be projected to the plane and tilted relative to the feed direction at the complementary angle of the angle of the projected cutting edge.

In accordance with other illustrative embodiments of the first aspect, a rake angle may be formed between a normal of a rake face of the cutting tool and a radial direction defined relative to the rotational axis, the rake angle being in a range from about 90° to about 105°. The radial direction may be a direction of the first axis. Accordingly selected rake angles may increase the toughness to avoid chipping. At angles of less than about 90°, the toughness of the cutting edge may be poor, while for rake angles greater than 105°, the cutting pressure may be too high.

In accordance with other illustrative embodiments of the first aspect, the cutting edge may have the shape of a substantially straight line. Accordingly, a simple but effective cutting edge may be provided.

In accordance with alternative embodiments hereto, the cutting edge may have the shape of a substantially curved line. Accordingly, improved cutting forces may be achieved. In accordance with some special illustrative examples herein, the cutting edge may be curved away from the workpiece towards at least one end of the cutting edge. In accordance with other special illustrative examples herein, a diameter of the workpiece may be determined at the rotationally symmetric surface of the workpiece and the substantially curved line may correspond to a circular arc of a circle having a radius which is substantially greater than about one quarter of the diameter.

In accordance with other illustrative embodiments of the first aspect, the rotationally symmetric surface of the workpiece may be an outer circumferential surface of the workpiece and outer surfaces of a workpiece may be machined.

In accordance with alternative embodiments hereto, the rotationally symmetric surface of the workpiece may be an inner circumferential surface of the workpiece and inner surfaces of a workpiece may be machined.

In accordance with some special illustrative embodiments herein, a diameter of the workpiece may be determined at the rotationally symmetric surface of the workpiece and the substantially curved line may correspond to a circular arc of a circle having a radius, the radius being substantially greater than about one quarter of the diameter and the radius being substantially smaller than about one half of the diameter. Accordingly, the substantially curved cutting edge may have an appropriate shape for machining inner surfaces.

In accordance with other illustrative embodiments of the first aspect, the cutting tool may be moved along the feed direction at a feed rate in a range from about 0.2 mm per revolution to about 1.2 mm per revolution.

In accordance with other illustrative embodiments of the first aspect, upon bringing the cutting edge into contact with the workpiece, the cutting edge may contact the workpiece along an active cutting portion of the cutting edge, wherein an effective length of the active cutting portion may be substantially smaller than a total length of the cutting edge. In accordance with special illustrative examples herein, the effective length may be in a range from about 30% to about 90% of the total length. In accordance with other special examples herein, the cutting edge may have, relative to the feed direction, a front end and a rear end, the cutting portion being spaced apart from at least one of the front end and the rear end by a distance of at most 1/50 of a diameter of the workpiece, the diameter being determined at the rotationally symmetric surface of the workpiece.

In a second aspect of the present disclosure, a turning apparatus for machining a rotationally symmetric surface of a workpiece in a machining operation is provided. In accordance with some illustrative embodiments herein, the turning apparatus may comprise a spindle configured to be rotatably driven by a driving device configured to perform a rotating motion around a rotational axis, a cutting tool support, the cutting tool support configured to hold a cutting tool having a cutting edge positioned at an edge of a rake face for performing the machining operation on a workpiece, and a feeding device configured to displace the cutting tool support relative to the spindle along a feed direction parallel to the rotational axis, wherein the cutting tool support is orientable such that a normal to the rake face is oriented askew the feed direction, a first axis and a second axis prior to performing the machining operation, the first axis and the second axis being perpendicular to the feed direction and perpendicular to each other.

In a third aspect, the present disclosure provides a turning apparatus for machining a rotationally symmetric surface of a workpiece. In accordance with some illustrative embodiments herein, the turning apparatus may comprise a spindle configured to be rotatably driven by a driving device configured to perform a rotating motion around a rotational axis, a cutting tool having a cutting edge positioned at an edge of a rake face for performing the machining operation on a workpiece, and a feeding device configured to displace the cutting tool relative to the spindle along a feed direction parallel to the rotational axis, wherein the cutting tool is orientable such that a normal to the rake face is oriented askew the feed direction, a first axis and a second axis prior to performing the machining operation, the first axis and the second axis being perpendicular to the feed direction and perpendicular to each other.

In accordance with some illustrative embodiments of at least one of the second and third aspects above, a projection of the cutting edge to a plane defined by the rotational axis and one of the first and second axes may be tilted relative to the feed direction at an angle in a range from about 35° to about 60°. In accordance with an illustrative example herein, the angle may be in a range from about 40° to about 50°. The normal to the rake face may be projected to the plane and tilted relative to the feed direction at the complementary angle of the angle of the projected cutting edge.

In accordance with some illustrative embodiments of the third aspect, the cutting tool may further comprise a rake face, wherein a rake angle formed between a normal of the rake face and a radial direction defined relative to the rotational axis may be in a range from about 90° to about 105°. The radial direction may be a direction of the first axis.

In accordance with other illustrative embodiments of the third aspect, the cutting edge may have the shape of a substantially straight line.

In accordance with alternative embodiments hereto, the cutting edge may have the shape of a substantially curved line. In accordance with some special examples herein, the cutting edge may be curved away from the spindle towards at least one end of the cutting edge.

In accordance with some illustrative embodiments of the second aspect, the feeding device may be configured for implementing a feed rate in a range from about 0.2 mm per revolution to about 1.2 mm per revolution.

In accordance with other illustrative embodiments of the second aspect, the cutting tool support may be configured to hold a cutting insert having at least one cutting edge.

Figure 1:
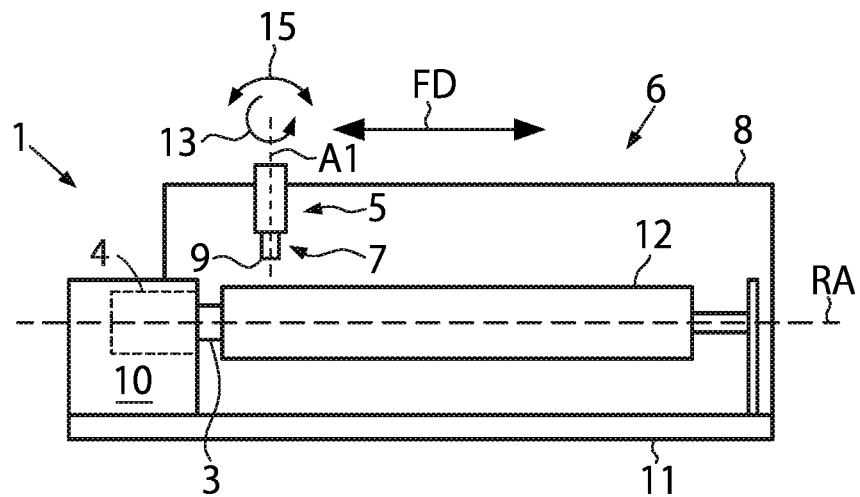
FIG. 1 schematically illustrates in a cross-sectional view a turning apparatus in accordance with some illustrative embodiments of the present disclosure.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the scope of the invention to the particular forms disclosed, but on the contrary, the intention is to cover all modifications, alternatives and equivalences falling within the spirit and scope of the invention as defined by the appended claims.

DESCRIPTION OF EMBODIMENTS

Described below are various illustrative embodiments of the present disclosure, wherein in the interest of clarity, not all features of an actual implementation are described. It will of course be appreciated that in the development of any such actual embodiment, numerous implementation-specific decisions must be made to achieve the specific goals of the developer, such as compliance with system-related and business-related constraints, which will vary from one implementation to another. Moreover, it will be appreciated that such a development might be complex and time-consuming, but would nevertheless be a routine undertaking for those of ordinary skills in the art having the benefit of this disclosure.

The present disclosure will now be described in greater detail with reference to the attached figures. Various structures, systems and devices are schematically depicted in the drawings for purposes of explanation only and so as to not obscure the present disclosure with details which are well-known to those skilled in the art. Nevertheless, the attached drawings are included to describe and explain some illustrative examples of the present disclosure as will be described below in greater detail. The words and phrases used herein should be understood and interpreted to have a meaning consistent with the understanding of those words and phrases used by the person with skills in the relevant art. No special definition of a term or phrase, i.e., a definition that is different from the ordinary or customary meaning as understood by the skilled person, is intended to be implied by a consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

A turning apparatus in accordance with some illustrative embodiments of the present disclosure will be described with regard to FIG. 1 in greater detail below.

FIG. 1 schematically illustrates a turning apparatus 1 in accordance with some illustrative embodiments of the present disclosure. The turning apparatus 1 may comprise a spindle 3 which may be rotatably driven by a driving device 4 such as a motor for performing a rotating motion around a rotational axis RA. The turning apparatus 1 may further comprise a cutting tool support 5 which is configured to hold a cutting tool 7. In accordance with some illustrative examples, the cutting tool 7 may be a non-rotary tool bit, e.g., a cutting tool insert. In some special illustrative, but not limiting examples herein, the cutting tool 7 may have a substantially plate-shape configuration with at least one cutting edge 9. In a special illustrative example, the cutting tool 7 may comprise a cutting insert having at least one cutting edge, e.g., a cutting insert having a hexagonal shape with 6 cutting edges or a cutter with a single cutting edge or a cutting tool with 3, 4, 5, or 7 cutting edges or a cutting insert having an octagonal shape with 8 cutting edges.

In accordance with some illustrative embodiments, the turning apparatus 1 may further comprise a feeding device 6 configured to displace the cutting tool support 5 relative to the spindle 3 along a feed direction (which is indicated in FIG. 1 by a double-arrow denoted by "FD") parallel to the rotational axis RA. In accordance with some illustrative embodiments, the cutting tool support 5 may comprise a carriage (not illustrated) which may be manually and/or automatically displaced along the feed direction FD relative to the spindle 3. Additionally or alternatively, the feeding device 6 may comprise a threaded rod 8 along which the cutting tool support 5 may be displaced.

In accordance with some exemplary embodiments herein, the cutting tool support 5 may comprise a driving unit (not illustrated) such that the cutting tool support 5 may be actively or passively driven for displacing the cutting tool 7 and the cutting edge 9 along the feed direction FD. For example, the driving unit (not illustrated) may be computer controlled and the like, i.e., the turning apparatus may be implemented as a CNC system ("CNC" denoting "computer numeric control" which is the automation of machine tools that are operated by precisely programmed commands encoded on a storage medium as opposed to manually controlled systems, e.g. by hand wheels or levers, or mechanically automated).

In some illustrative embodiments, the turning apparatus 1 may comprise a control unit (not illustrated) which may be provided in addition to the system as schematically illustrated in FIG. 1 or integrated into the system as schematically illustrated in FIG. 1. For example, a control unit (not illustrated) may be integrated into driving device 4 used for rotatably driving the spindle 3.

Figure 3:
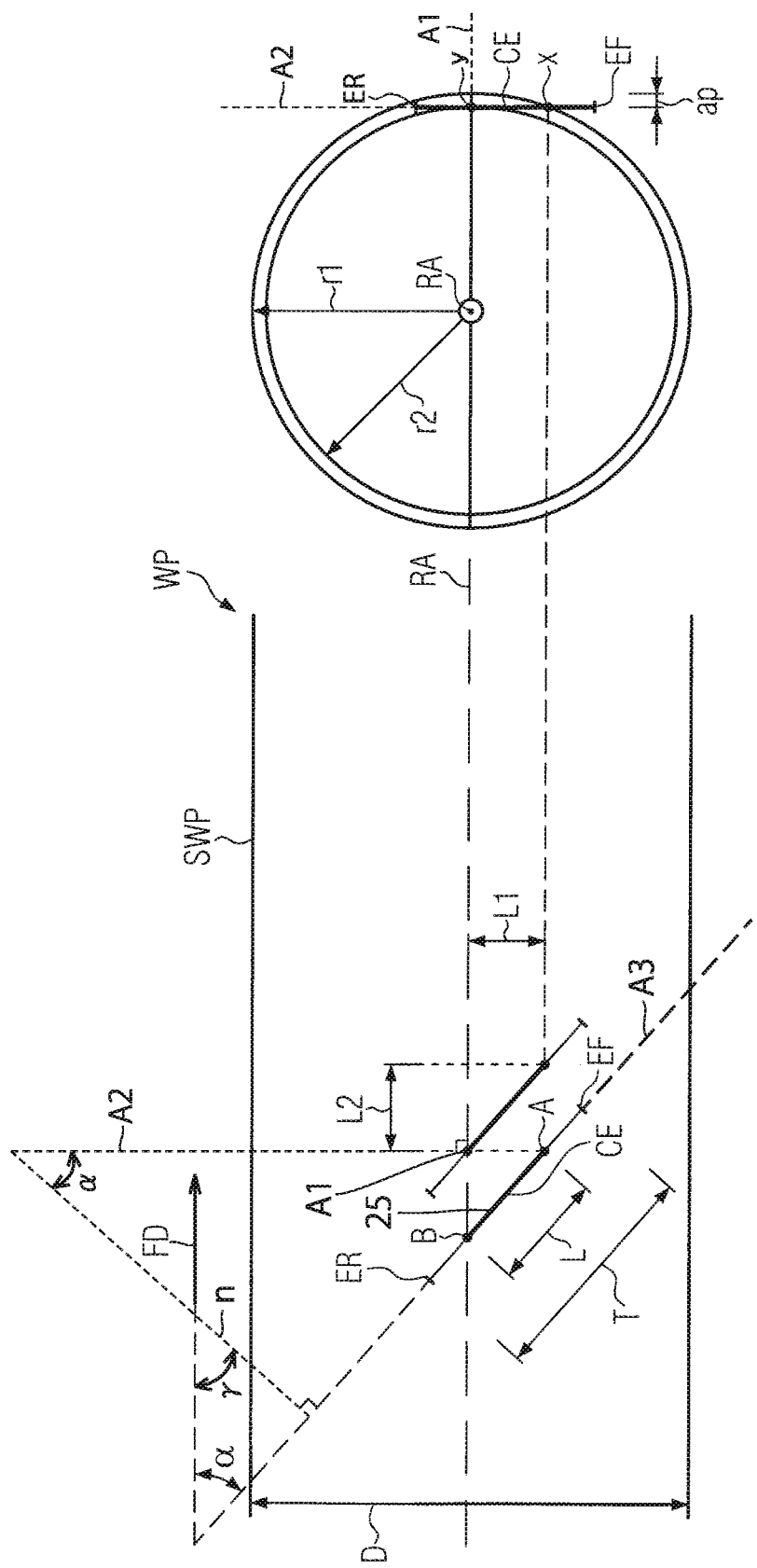
FIG. 3A schematically illustrates in a plan view along the rotational axis an arrangement of a cutting edge relative to a workpiece.
FIG. 3B schematically illustrates in a front view an arrangement of a cutting edge relative to a workpiece.

In accordance with some illustrative embodiments of the present disclosure, at least one of the cutting tool support 5 and the cutting tool 7 may be configured so as to be arranged relative to the spindle 3 in accordance with the degrees of freedom as indicated in FIG. 1 by means of reference numerals 13 and 15. Herein, reference numeral 13 indicates a tilting arrangement of the cutting tool support 5 and/or the cutting tool 7 such that the cutting tool 7 may be tilted around an axis A1 (a first axis) of the cutting tool 7. The axis A1 may be orthogonal to a second axis (an axis A2 shown in FIG. 3), and the rotational axis RA or the feed direction FD. Accordingly, the cutting edge 9 may be arranged relative to the spindle 3 and the rotational axis RA (or the feed direction FD) in a tilting arrangement 13 to orient the cutting edge 9 askew the feed direction FD prior to bringing the cutting edge 9 in contact with a workpiece 12 mounted on the spindle 3.

In accordance with some illustrative embodiments of the present disclosure, the cutting tool support 5 and/or the cutting tool 7 may be further tilted around an axis A3 as a third axis (not illustrated), as indicated via the double-arrow 15, prior to bringing the cutting edge 9 in contact with a workpiece 12 mounted on the spindle 3. Accordingly, a rake face (not illustrated) of the cutting tool 7 may be arranged relative to spindle 3 and the rotational axis RA (or the feed direction FD) to orient the rake face askew the feed direction, as will be described below in greater detail with regard to FIG. 4.

The person skilled in the art will appreciate that, in the turning apparatus 1, the spindle 3 defines the rotational axis RA of the turning apparatus 1. In accordance with some illustrative embodiments herein, the spindle 3 may be implemented as a shaft, which may be rotatably coupled to driving device 4 by means of bearings for supporting the shaft as known in the art. The spindle 3 may be basically coupled to a headstock 10 which may further include driving means (not illustrated) for rotatably driving the spindle 3. For example, the headstock may comprise a gear arrangement (not illustrated), a speed mechanism (not illustrated), a speed change mechanism (not illustrated) and the like. The spindle 3 may further comprise a work holding device (not illustrated) for holding the workpiece 12, such as chucks, face plates, collets, a Morse taper to allow the insertion of hollow tubular (Morse standard) tapers, female threads, male threads, and the like.

In accordance with some illustrative embodiments of the present disclosure, the turning apparatus 1 may further comprise a base 11 to which the headstock 10, the spindle 3, and the cutting tool support 5 are mounted. The base 11 may be configured to permit the cutting tool support 5 to be moved parallel to the rotational axis RA, that is, along the feed direction FD. As described above, the cutting tool support 5 may be driven by a rack-and-pinion system (not illustrated) and the like. Furthermore, the base 11 may further comprise a leveling device (not illustrated) for leveling the spindle 3 and/or the cutting tool support 5. In accordance with some further optional illustrative examples herein, the headstock 10 may be displaceably mounted on the base 11, e.g., by means of a XYZ displacement system (not illustrated) for aligning and/or orienting the spindle 3 relative to a workpiece 12 prior to contacting the workpiece 12.

In accordance with some illustrative embodiments of the present disclosure, the turning apparatus 1 may be a lathe apparatus.

Figure 2:
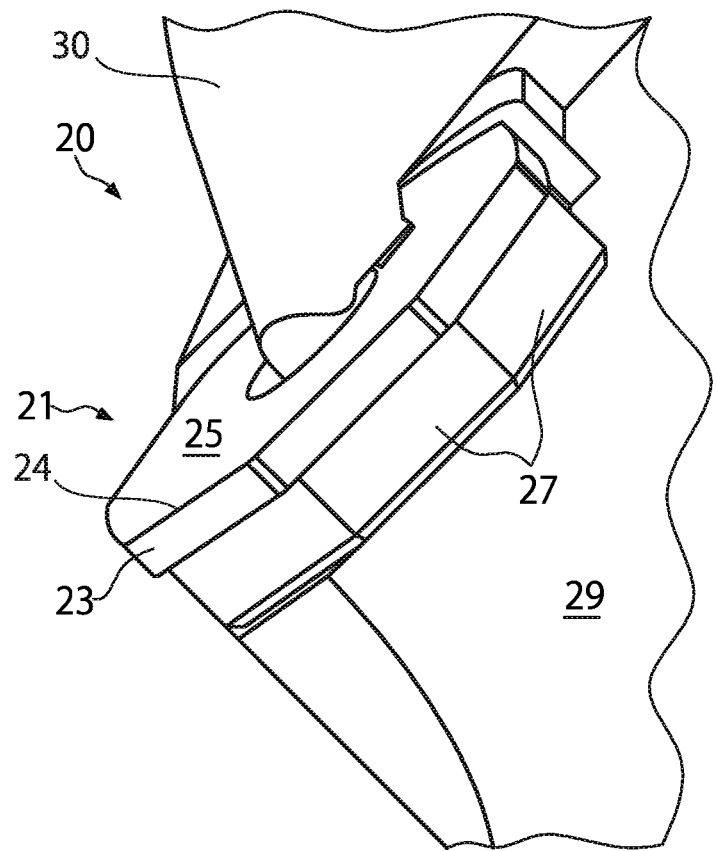
FIG. 2 schematically illustrates in an enlarged schematic view a portion of a cutting tool in accordance with some illustrative embodiments of the present disclosure.

With regard to FIG. 2, an enlarged perspective view of the cutting tool 7 in FIG. 1 in a region of the cutting edge 9 is provided. FIG. 2 shows an enlarged view of a cutting tool 20 having a plate-shaped cutting tool insert 21, such as a hexagonal cutting insert or an octagonal cutting insert among other examples as listed above. The cutting insert 21 may comprise at least one cutting edge 24, e.g., eight cutting edges as schematically illustrated in FIG. 2, although this does not pose any limitation to the present disclosure and the person skilled in the art will appreciate that at least one cutting edge may be provided.

The cutting insert 21 further has a rake face 25 which helps to guide a chip flow during machining. Furthermore, the cutting insert 21 may further comprise peripheral surfaces 27 of contact for insert seat (pocket) towards a body 29 of the cutting tool 20. In accordance with some illustrative embodiments herein, the cutting insert 21 may be replaceably mounted to the body 29 of the cutting tool 20 by a clamp 30.

The cutting edge 24 may be formed between the rake face 25 and a flank 23 (surface(s) over which the surface produced on the workpiece passes) and may be considered as an edge formed at the intersection of the rake face 25 and the flank 23. Therefore, the cutting edge 24 is positioned at the edge of the rake face 25.

With regard to FIGS. 3A and 3B, machining of a rotationally symmetric surface SWP of a workpiece WP will be explained in greater detail. For not obscuring the present disclosure with too much details, the rotationally symmetric surface SWP of the workpiece WP is schematically illustrated as a cylindrical surface, particularly as a circumferential surface of a cylindrical body. However, the person skilled in the art will appreciate that the present disclosure is not limited to a circumferential surface of a cylinder.

FIG. 3A schematically illustrates a top view of the symmetric surface SWP of the workpiece WP perpendicular to the rotational axis RA at a stage during machining of the surface SWP where a cutting edge CE of a cutting tool (not illustrated) is brought in contact with the workpiece WP. During machining of the surface SWP of the workpiece WP, the cutting edge CE is moved along a feed direction FD parallel to the rotational axis RA as indicated in FIG. 3A.

In accordance with some illustrative embodiments of the present disclosure, machining the surface SWP of the workpiece WP may comprise rotationally driving the workpiece WP around the rotational axis RA, arranging the cutting edge CE relative to the workpiece WP such that the cutting edge CE is tilted relative to the feed direction FD, bringing the cutting edge into contact with the workpiece WP, and advancing the cutting edge CE relative to the workpiece WP along the feed direction FD parallel to the rotational axis RA.

In accordance with some illustrative embodiments of the present disclosure, the cutting edge CE may be tilted relative to the feed direction FD. A virtual plane may be defined by the rotational axis RA and the axis A2 which is perpendicular to the rotational axis RA. In accordance with some illustrative embodiments of the present disclosure, a projection of the cutting edge CE to the plane may be in the shape of a straight line, as illustrated in FIG. 3A. The projected cutting edge CE may be tilted relative to the feed direction FD at an angle $\alpha$ in a range from about 35° to about 60°. For example, the angle $\alpha$ may be in a range from about 40° to about 50°. In accordance with a special illustrative example herein, the angle $\alpha$ may be substantially equal to or close to 45°.

In accordance with some illustrative embodiments of the present disclosure, the cutting edge CE may be substantially in the shape of a straight line. In accordance with some illustrative examples herein, the angle $\alpha$ may be determined by defining an angle $\gamma$ between the projected cutting edge CE and a projection of a normal to the rake face 25 into the virtual plane defined by the rotational axis RA and the axis A2, see projected normal n as schematically indicated in FIG. 3A. It is pointed out that, in the schematic illustration of FIG. 3A, the rake face 25 may be understood as being projected onto the cutting edge CE and a normal to the rake face 25 is actually perpendicular to the cutting edge CE. The angles α and γ are interrelated via α=90°−γ. That is, the angle α is a complementary angle of the angle γ, and vice versa. The range of values for α accordingly results in a range of possible values for γ, and the angle γ may be in a range from about 30° to about 55°, e.g., in a range from about 40° to about 50°. The projected normal n may also be tilted relative to the axis A2 at the angle α, as indicated in FIG. 3A.

As shown in FIG. 3A, the direction of the normal n is set to a direction rotated around the axis A1 by the angle α from the start direction identical to the direction of axis A2, such that the normal n from the rake face 25 is directed to the feed direction FD. If the cutting edge CE is positioned such that the normal n of the rake face 25 is directed to a tangent of the workpiece WP, the direction of the normal n corresponds to the start direction. In addition, the direction of the normal n is set to be rotated around the axis A3 by the angle δ such that the normal n from the rake face 25 is directed to the feed direction FD. The axis A3 corresponds to an axis which originally corresponds to the rotational axis RA and is rotated around the axis A1 (the first axis) by the angle α.

In accordance with some other illustrative embodiments of the present disclosure, the cutting edge CE may be substantially in the shape of a curved line, in which case the schematic illustration of CE in FIG. 3A as a straight line still applies because FIG. 3A shows a projective view onto the cutting edge CE. With regard to FIG. 3B it is clear that with the cutting edge CE having the shape of a curved line, the cutting edge CE in FIG. 3B would be accordingly curved. In the case of the cutting edge having a shape of a curved line, the cutting edge has a (local) extremum (i.e., the first derivative of a parameterization of a curved line representing the curved shape of the cutting edge CE vanishes). In a special but not limiting illustrative example herein, the cutting edge may have a substantially symmetric shape and the (local) extremum may be in the center of the curved line that represents the curved shape.

A total length T of the cutting edge CE may be given as a distance between ends ER and EF of the cutting edge. Upon bringing the cutting edge CE into contact with the workpiece WP, the cutting edge CE contacts the workpiece WP along an effective length L which is smaller than the total length T (L<T). That is, during the machining of the workpiece WP, the cutting edge CE is in contact with the workpiece WP between points A, B of the cutting edge CE and not along the complete length T of the cutting edge CE.

In accordance with some illustrative examples herein, the effective length L may be in a range of about 30% of the total length T to about 90% of the total length T.

In accordance with some illustrative embodiments of the present disclosure, at least one of the points A, B may be spaced apart from the closer one of the respective ends ER, EF by, at most, 1/50 of a diameter D of the workpiece WP. In accordance with some illustrative embodiments, the diameter D of the workpiece WP may be determined at the rotationally symmetric surface SWP that is subjected to machining. In accordance with some other illustrative embodiments of the present disclosure, the cutting edge CE may have the total length from the point A to the end ER, or from the point B to the end EF.

In accordance with some illustrative embodiments of the present disclosure, the tilting of the cutting edge CE relative to the feed direction FD further defines an effective length L1 which is the projection of the cutting edge CE onto a direction along the axis A2 perpendicular to the rotational axis RA. That is, material of the surface SWP is chipped off having a width in accordance with L1, while an effective length L2 may be considered as the projection of the cutting edge CE onto the virtual plane defined by the feed direction FD or the rotational axis RA and the axis A1.

In accordance with some special illustrative, but non-limiting examples, the effective length L may be at about 4.0 mm, while L1 may be at about 2.3 mm and L2 may be at about 2.3 mm when assuming the angle α as being equal to about 45°. If the angle α is bigger than 45°, the length L and L2 are smaller and a width of a chip is smaller.

A further parameter characterizing the machining of the workpiece WP may be given by a feed rate f (not illustrated) which corresponds to the distance that a point of the cutting edge CE, without limitation point A, advances along the feed direction FD during one revolution of the workpiece WP. In accordance with some illustrative embodiments of the present disclosure, the feed rate may be in a range from about 0.2 mm/revolution to about 1.2 mm/revolution.

FIG. 3B schematically illustrates a cross-sectional view onto the workpiece WP of FIG. 3A along the rotational axis RA. Particularly, the cross-sectional view of FIG. 3B is perpendicular to the illustration of FIG. 3A. The axis A1 is perpendicular to the axis A2. The axis A1 is also perpendicular to the feed direction FD or the rotational axis RA.

FIG. 3B shows the machining of the workpiece WP, and the cutting edge CE is brought into contact with the workpiece WP such that the cutting edge CE penetrates the workpiece WP to a cutting depth ap as indicated in FIG. 3B. The cutting depth ap is related to a radius r1 of the workpiece WP, the radius r1 being half of the diameter D (r1=½D) in FIG. 3A, and a radius r2 which corresponds to the radius of the machined workpiece WP at an end Y of the cutting edge CE, wherein the radius r2 is substantially orthogonal to the cutting edge CE at an end Y.

The end Y and an opposite end X basically correspond to respective ends B, A as indicated in FIG. 3A. Particularly, the cutting edge CE extending between the ends X, Y contacts the workpiece WP and causes chipping of surface material of the workpiece WP in accordance with the cutting depth ap.

With regard to FIG. 3A, it is recalled that, due to the tilted arrangement of the cutting edge CE relative to the feed direction FD, the end EF close to the end A of the effective length L is a front end or relative to the feed direction FD forward directed (upstream relative to the feed direction). In other words, the end EF is an end of the cutting edge CE that advances the opposite end ER close to the end B of the effective length L, the end ER being backwards directed (downstream relative to the feed direction). Accordingly, the end EF may be referred to as "front end", while the end ER may refer to as "rear end" relative to the feed direction FD as caused by the tilted arrangement due to angle α. In other words, the point B may be positioned upstream in the direction of rotation (not illustrated) around the rotational axis RA relative to the point A.

As the cutting edge CE is moved along the feed direction relative to the workpiece WP, the contact point of the cutting edge CE contacting the surface SWP shifts from the point A to the point B. The portion at the point A of the cutting edge CE bites into the workpiece WP most shallowly and chips off surface material of the workpiece WP, while the portion at the point B of the cutting edge CE bites into the workpiece WP most deeply and chips off surface material of the workpiece WP.

When assuming that the cutting depth ap is very small when compared to either one of the radius r1 and the radius r2 ("ap<<r1, r2"), the following relation is satisfied:

$$D \cdot ap = L1^2 (r2 = r1 - ap; L1^2 + L2^2 = L^2; \tan\alpha = L1/L2; \sin\alpha = L1/L; \cos\alpha = L2/L).$$

In accordance with some illustrative embodiments of the present disclosure, the length L1 may be in a range from 1.5 to 3.5 mm. In accordance with special illustrative examples herein, the workpiece WP may have a diameter D greater than or equal to 30 mm. Possible values for the cutting depth ap may be in the order of 0.25 mm.

In accordance with some illustrative embodiments of the present disclosure, the workpiece WP as illustrated in FIG. 3A may also refer to hollow cylindrical configurations, that is, the diameter D may correspond to a diameter of an inner bore of a hollow cylindrical workpiece WP. Accordingly, the surface SWP may represent an inner circumferential surface of the workpiece WP. Alternatively, the workpiece WP may be a cylindrical workpiece and the surface SWP may represent an outer circumferential surface. The person skilled in the art will appreciate that, in case of hollow cylindrical configurations of the workpiece WP, FIG. 3B may be adapted by reverting the order of the ends EF and ER. That is, the end EF actually corresponds to the end ER, while the end ER actually corresponds to the end EF in case of a hollow cylindrical configuration. Otherwise, the discussion above regarding the cutting depth ap and the above listed relations still apply.

With regard to FIG. 4, further illustrative embodiments of the present disclosure will be described.

Figure 4:
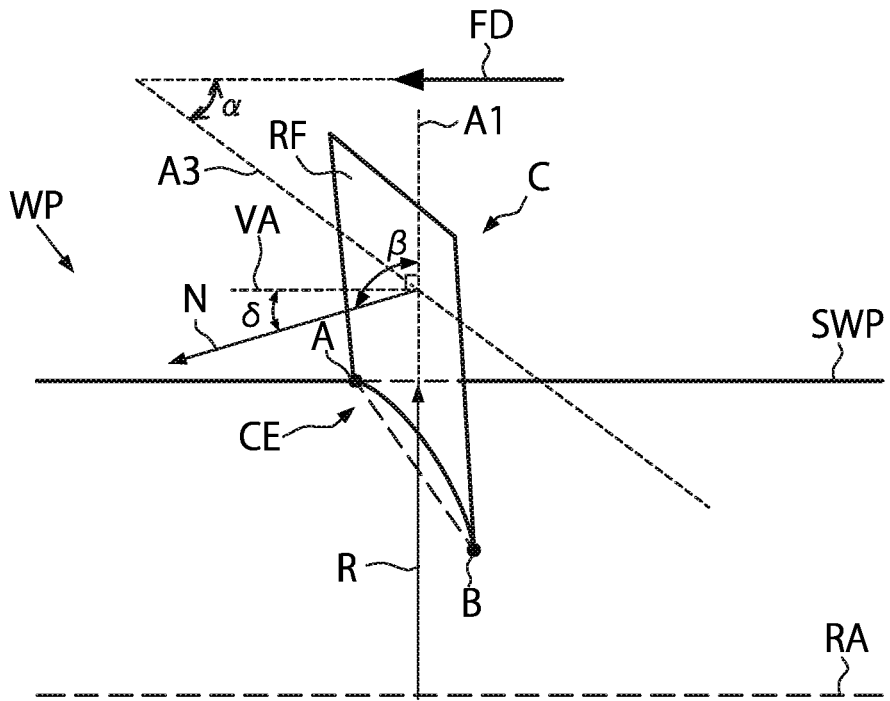
FIG. 4 schematically illustrates an arrangement of a rake face relative to a workpiece.

FIG. 4 schematically illustrates a portion of a cutting tool C having a cutting CE being in contact with a surface SWP of a workpiece WP. In accordance with illustrative embodiments, the surface SWP of the workpiece WP may be an outer circumferential surface of the workpiece WP. This does not pose any limitation to the present disclosure and instead, the surface SWP may denote an inner circumferential surface of the workpiece WP (herein, the cutting tool C would be located between the rotational axis RA and the surface SWP).

With regard to FIG. 4, a feed direction FD is specified similar to other embodiments described above, the feed direction FD being substantially parallel to a rotational axis RA around which the workpiece WP rotates during machining the workpiece WP. The rotational axis RA and the surface SWP at the portion of the workpiece WP to be subjected to any machining may substantially implement a cylinder symmetry and cylinder coordinates comprising the rotational axis RA and a radial coordinate vector R may be defined, the radial coordinate vector R being selected from a class of vectors (symmetric regarding rotations around the rotational axis RA) indicating possible radial directions in accordance with the radial coordinate component of cylinder coordinates (r, z), wherein the z coordinate component is associated with the rotational axis RA. The radial coordinate vector R is substantially perpendicular to the rotational axis RA (and to the feed direction FD because the feed direction FD and the rotational axis RA are parallel). In accordance with some illustrative embodiments of the present disclosure, the radial coordinate vector R may be parallel to the axis A1 illustrated in FIGS. 3A and 3B.

With regard to FIG. 4, an arrangement of the cutting tool 7 in FIG. 1 as indicated by the double arrow 15 is explained in greater detail. The arrangement of the cutting tool C in FIG. 4 is such that a rake face RF of the cutting tool C may be tilted relative to the feed direction FD such that an angle β is formed between the radial vector R and a normal vector N of the rake face RF. The person skilled in the art will appreciate that tilting of the rake face RF around the radial vector R is indicated in FIG. 1 via the double-arrow 15.

The cutting edge CE may be rotated around the axis A3. An angle δ is between the normal N of the rake face RF and a virtual axis VA perpendicular to the axis A1 or the radial coordinate vector R. When the cutting edge CE is positioned such that the normal N is perpendicular to the axis A1 or the rake face RF is parallel to the axis A1, the angle δ is 0°. The angles β and δ are interrelated via β=90°+δ. The angle δ may be in a range from about 0° to about 15°.

As shown in FIGS. 3A, 3B and 4, in accordance with some illustrative embodiments of the present disclosure, the normal to the rake face of the cutting tool C is tilted relative to the feeding direction FD, the first axis perpendicular to the feeding direction FD and the second axis perpendicular to both the feeding direction FD and the first axis. The first axis and the second axis are perpendicular to the rotational axis RA and perpendicular to each other. In other words, a projection of the cutting edge CE to the plane defined by the feed direction and the first axis is parallel to the feed direction, and an another projection of the cutting edge CE to the plane defined by the feed direction and the second axis is tilted relative to the feed direction and the second axis. The first axis and the second axis may be one and the other of the axes A1 and A2, respectively.

In accordance with some illustrative embodiments of the present disclosure, the angle β may be in a range from about 90° to about 105°. For example, the angle β may be adjusted so as to achieve good chipping resistance and low friction forces during a cutting or turning operation.

Figure 5:
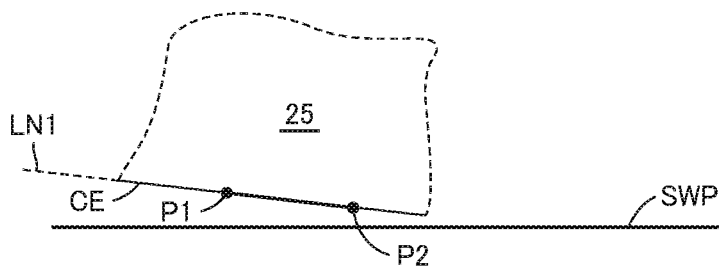
FIG. 5 schematically illustrates a configuration of a cutting edge in accordance with some illustrative embodiments of the present disclosure.

In accordance with some illustrative embodiments of the present disclosure, the cutting edge (c.f. 9 in FIG. 1, 24 in FIG. 2, and CE in FIGS. 3A, 3B, and 4) may have the shape of a substantially straight line (indicated in FIG. 4 as a broken line denoting the active portion of the cutting edge CE which is in contact with the workpiece between the points A, B similar to the discussion of FIGS. 3A and 3B above). FIG. 5 schematically illustrates a cutting edge CE arranged relative to a surface SWP of a workpiece (not further illustrated), the surface SWP being one of an inner circumferential surface and an outer circumferential surface of the workpiece (not further illustrated). In accordance with some illustrative embodiments, the cutting edge CE may have the shape of a straight line. A virtual line LN1 is formed by connecting points P1 and P2 on the cutting edge CE, and extends in the same direction as the extending direction of the cutting edge CE. The point P1 may correspond to one of the points A and B shown in FIGS. 3A and 4, while the point P2 may correspond to the other of the points A and B.

Figure 6:
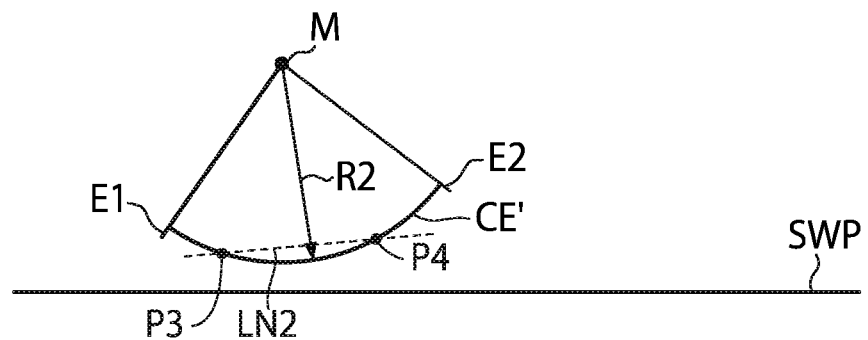
FIG. 6 schematically illustrates a configuration of a cutting edge in accordance with some illustrative embodiments of the present disclosure.

In accordance with alternative embodiments of the present disclosure, the cutting edge may have the shape of a substantially curved line. FIG. 6 schematically illustrates a cutting edge CE' arranged relative to a surface SWP of a workpiece (not further illustrated), the surface SWP being one of an inner circumferential surface and an outer circumferential surface of the workpiece (not further illustrated).

In accordance with some illustrative embodiments, the cutting edge CE' may have the shape of a substantially curved line, e.g. a concave shape relative to the surface SWP, wherein at least one end of the cutting edge CE', that is one of the ends E1, E2, is curved away from the surface SWP.

In accordance with some illustrative embodiments of the present disclosure, such as schematically illustrated in FIG. 6, the cutting edge CE' may be a substantially curved line corresponding to a circular arc of a circle (not illustrated in FIG. 6), the circle having a radius R2 and a center M. The curvature of the cutting edge CE' may be such that the center M of the circle (not illustrated) is located at a greater distance from the surface SWP than the cutting edge CE'.

A line LN2 is a virtual line connecting points P3 and P4 on the cutting edge CE'. A projection of the cutting edge CE' into the plane defined by axis A2 and the rotational axis RA is in the shape of a straight line as shown in FIG. 3A. In this case, the line LN2 corresponds to at least a part of the projected cutting edge CE'.

In accordance with some illustrative embodiments of the present disclosure, assuming that a workpiece (not illustrated in FIG. 6) has a diameter D (not illustrated in FIG. 6) at a rotational symmetric surface of the workpiece (not illustrated in FIG. 6), that surface being subjected or intended to machining, the radius R2 may be substantially greater than about one quarter of the diameter D (R2>D/4).

In accordance with some illustrative embodiments herein, according to which the surface SWP may be an inner circumferential surface, the radius R2 may be additionally limited to be smaller than about one half of the diameter D (D/2>R2).

Figure 7:
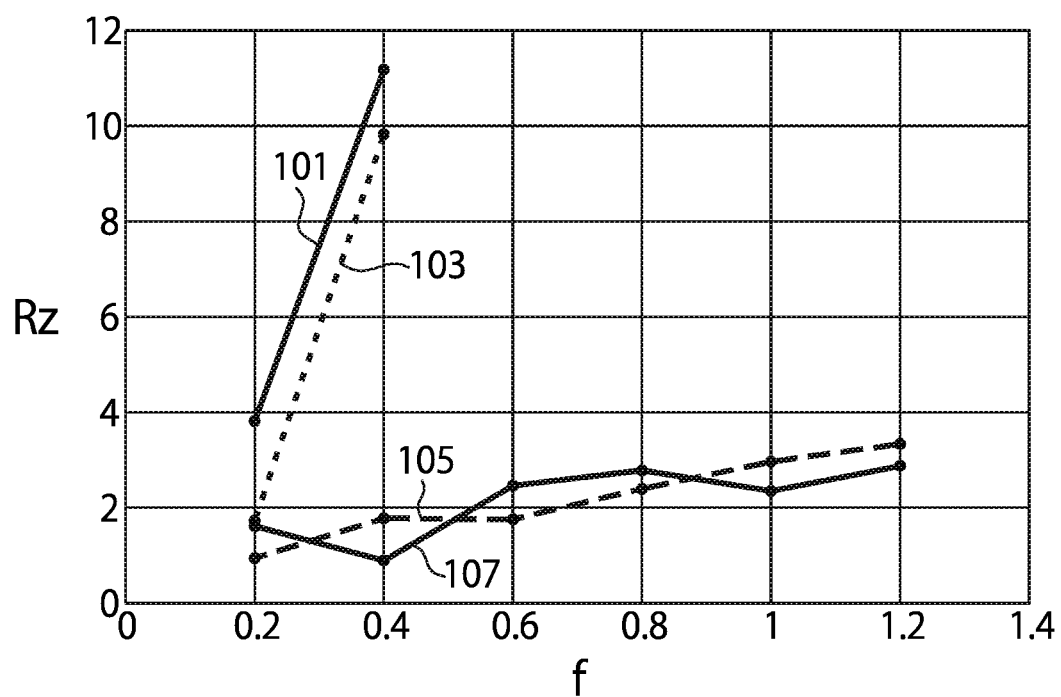
FIG. 7 schematically illustrates a graphical relation between a surface roughness and a feed rate for turning apparatuses in accordance with illustrative embodiments of the present disclosure and some comparative examples.

FIG. 7 schematically illustrates a graphical relation between a surface roughness Rz (plotted along the ordinate in FIG. 7, usually measured in the units of μm) and a feed rate f (plotted along the abscissa in FIG. 7, usually measured in the units of mm/revolution). Conventional turning devices have a cutting edge oriented in parallel to a feed direction. According to comparative examples employing convention turning devices, a relation between the surface roughness Rz of a surface being subjected to machining with a cutting tool may follow one of the lines 101 and 103 as schematically illustrated in FIG. 7. The person skilled in the art will appreciate that the explicitly illustrated linear behavior may be a consequence of a linear interpolation between two measurement points and is not intended for any limitation of the present disclosure. As the lines 101 and 103 show, conventional turning systems have a substantially increasing surface roughness Rz at increasing feed rates f. For example, as measured in the comparative examples according to lines 101 and 103 in FIG. 7, upon doubling the feed rate f from 0.2 mm/revolution to 0.4 mm/revolution, the surface roughness RZ increases with a factor of roughly "3".

As opposed to the comparative examples, lines 105 and 107 schematically show a relation between the surface roughness and the feed rate in a turning apparatus in accordance with the description of the various embodiments of the present disclosure provided above. As the curves of the lines 105 and 107 show, an increase in the surface roughness over a rather long range of feed rates up to relatively fast feed rates of 1.2 mm/revolution do not even lead to a doubling (factor<2) of the surface roughness Rz. Accordingly, turning apparatuses in accordance with the various embodiments of the present disclosure allow to machine surfaces at increased feed rates without increasing the surface roughness to an unacceptable degree.

Figure 8A:
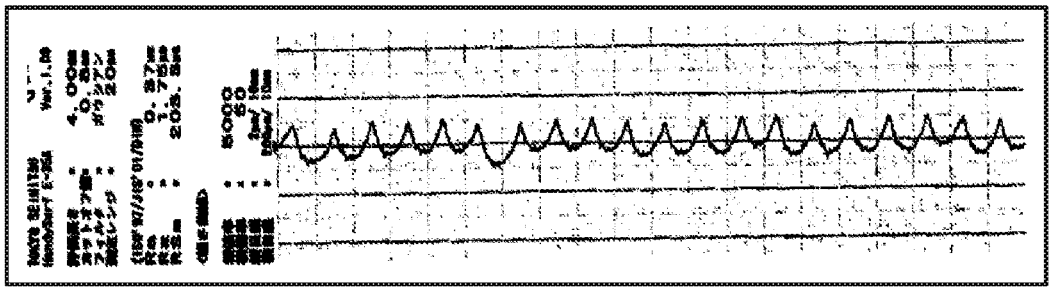
FIG. 8A schematically illustrates a graphical representation of the surface roughness of a machined surface in accordance with a comparative example.
Figure 8B:
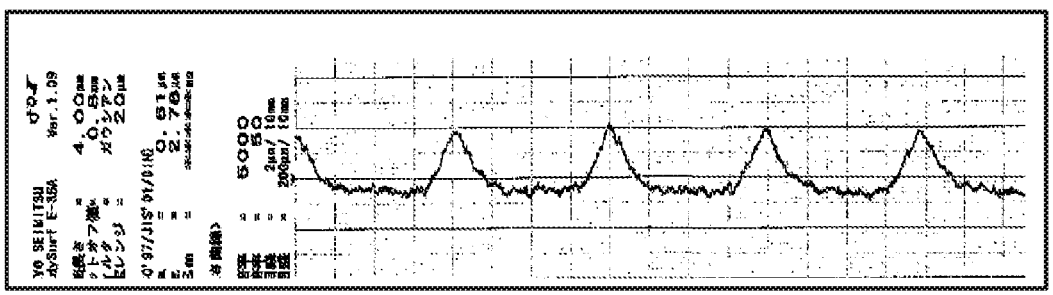
FIG. 8B schematically illustrates the surface roughness of a machine surface as obtained in accordance with an illustrative embodiment of the present disclosure.
Figure 9A:
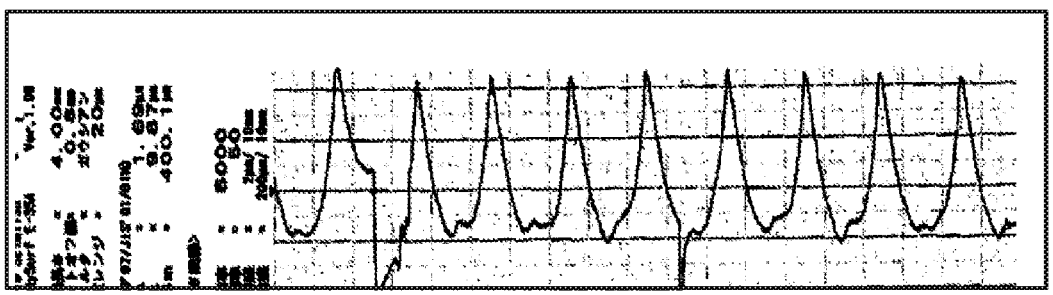
FIG. 9A schematically illustrates the surface roughness in accordance with a comparative example.
Figure 9B:
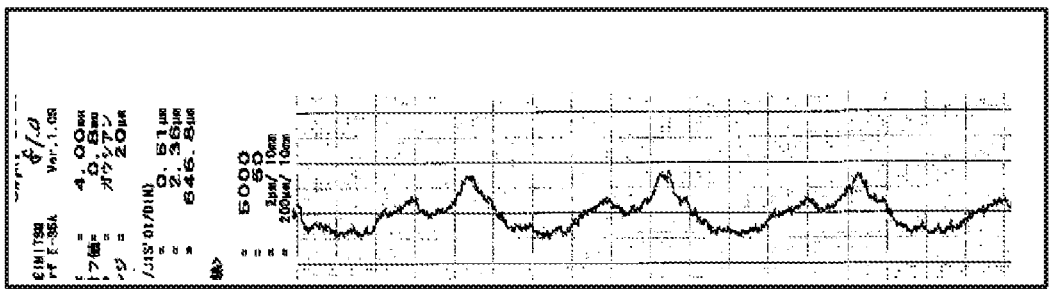
FIG. 9B schematically illustrates the surface roughness as obtained in accordance with an illustrative embodiment of the present disclosure.

FIGS. 8A, 8B, 9A and 9B show various measurements as performed with regard to comparative examples (c.f. FIGS. 8A and 9A), and illustrative examples in accordance with the present disclosure (c.f. FIGS. 8B and 9B).

FIG. 8A shows a measurement performed with a standard cutting tool at a feed rate of 0.2 mm/revolution leading to a surface roughness Rz of 1.75 μm (c.f. line 103 in FIG. 7).

FIG. 9A shows a measurement in accordance with a conventional cutting tool at a feed rate of 0.4 mm/revolution leading to a surface roughness Rz of 9.87 μm (c.f. line 103 in FIG. 7).

FIG. 8B shows a measurement obtained with a turning apparatus, as described above with regard to the various illustrative embodiments of the present disclosure, according to which the cutting edge is tilted relative to the feed direction, wherein the feed rate was adjusted to 0.8 mm/revolution. Herein, a surface roughness Rz of 2.78 μm was obtained (c.f. line 107 in FIG. 7).

FIG. 9B shows a measurement with the turning apparatus of the illustrative embodiment at a higher feed rate of 1.2 mm/revolution leading to a surface roughness Rz of 2.87 μm (c.f. line 107 in FIG. 7).

Accordingly, good quality of surface roughness at high feed speed may be achieved in turning apparatuses in accordance with various illustrative embodiments as described above and in accordance with a method for machining a rotational symmetric surface of a workpiece in accordance with various illustrative embodiments as described above.

Although the above described workpieces may have rotationally symmetric surfaces, this does not pose any limitation on the present disclosure. For example, apart from workpieces having an at least partially cylindrical shape, square and odd-shaped workpieces may also be machined in accordance with the disclosure. Upon machining square and odd-shaped workpieces, suitable turning apparatuses may employ special chucks or fixtures for holding such workpieces.

The person skilled in the art will appreciate that the present disclosure shows embodiments in which a cutting tool is advanced relative to a workpiece along a feed direction parallel to a rotational axis. In accordance with some embodiments herein, the cutting tool may be actively moved along the feed direction, while the workpiece is fixed, while in accordance with some alternative embodiments herein, the workpiece may be actively moved along the feed direction, while the cutting tool is fixed. Similarly, orienting a cutting tool relative to a workpiece, such as adjusting a desired tilt and/or rake angle, may involve moving one of the cutting tool and the workpiece while the other one of the cutting tool and the work piece is fixed. The person skilled in the art will appreciate that "advancing X relative to Y" indicates both "X being actively moved and Y being at rest", and "Y being actively moved and X being at rest".

The particular embodiments disclosed above are illustrative only, as the invention may be modified in practice and may be practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A method of machining a rotationally symmetric surface of a workpiece, said method comprising:
    rotationally driving said workpiece around a rotational axis,
    arranging a cutting tool with a cutting edge positioned at an edge of a rake face relative to said workpiece,
    bringing said cutting tool into contact with said workpiece, and advancing said cutting tool relative to said workpiece along a feed direction parallel to said rotational axis, wherein a normal to said rake face is tilted relative to said feed direction, a first axis and a second axis, the first axis and the second axis being perpendicular to the feed direction and perpendicular to each other, wherein a direction of said normal of said rake face is set to a direction (i) rotated around said first axis by an angle $\alpha$ from a start direction identical to a direction of said second axis, such that said normal from said rake face is directed to said feed direction and (ii) rotated around a third axis by an angle $\delta$ such that said normal from said rake face is directed to said feed direction, and said third axis corresponds to an axis which originally corresponds to said rotational axis and is rotated around said first axis by said angle $\alpha$, wherein said angle $\alpha$ is in a range from 35° to 60°, wherein said angle $\delta$ is in a range from 0° to 15°, and wherein a feed rate of said cutting tool is in a range from 0.2 mm per revolution to 1.2 mm per revolution.

2. The method of claim 1, wherein said cutting edge has the shape of a straight line.

3. The method of claim 1, wherein said cutting edge has the shape of a curved line.

4. The method of claim 3, wherein said cutting edge is curved away from said workpiece towards at least one end of said cutting edge.

5. The method of claim 3, wherein a diameter of said workpiece is determined at said rotationally symmetric surface of said workpiece, and wherein said curved line corresponds to a circular arc of a circle having a radius, said radius being greater than one quarter of said diameter.

6. The method of claim 1, wherein said rotationally symmetric surface of said workpiece is an outer circumferential surface of said workpiece.

7. The method of claim 1, wherein said rotationally symmetric surface of said workpiece is an inner circumferential surface of said workpiece.

8. The method of claim 7, wherein said cutting edge has the shape of a curved line, wherein a diameter of said workpiece is determined at said rotationally symmetric surface of said workpiece, and wherein said curved line corresponds to a circular arc of a circle having a radius, said radius being greater than one quarter of said diameter and said radius being smaller than one half of said diameter.

9. The method of claim 1, wherein upon engaging said workpiece, said cutting edge contacts said workpiece along an active cutting portion of said cutting edge, an effective length of said active cutting portion being smaller than a total length of said cutting edge.

* * * * *